(No Model.)

H. THÜRFELDER.
APPARATUS FOR MOLDING ARTICLES OF AMBER, &c.

No. 461,721. Patented Oct. 20, 1891.

WITNESSES:
Edward Wolff
William J. Miller

INVENTOR:
Hermann Thürfelder
BY
Van Sentwoord & Hauff
ATTORNEYS

UNITED STATES PATENT OFFICE.

HERMANN THÜRFELDER, OF NEW YORK, N. Y., ASSIGNOR TO WM. DEMUTH & CO., OF SAME PLACE.

APPARATUS FOR MOLDING ARTICLES OF AMBER, &c.

SPECIFICATION forming part of Letters Patent No. 461,721, dated October 20, 1891.

Application filed May 14, 1891. Serial No. 392,738. (No model.)

*To all whom it may concern:*

Be it known that I, HERMANN THÜRFELDER, a subject of the Emperor of Austria, residing at New York, in the county and State of New York, have invented new and useful Improvements in Apparatus for Molding Articles of Amber, &c., of which the following is a specification.

This invention relates to an apparatus for producing various articles of amber or other resinous substances by forcing the substance in a molten state into suitable molds.

The peculiar and novel construction of my apparatus is pointed out in the following specification and claims, and illustrated in the accompanying drawings, in which—

Figure 1:
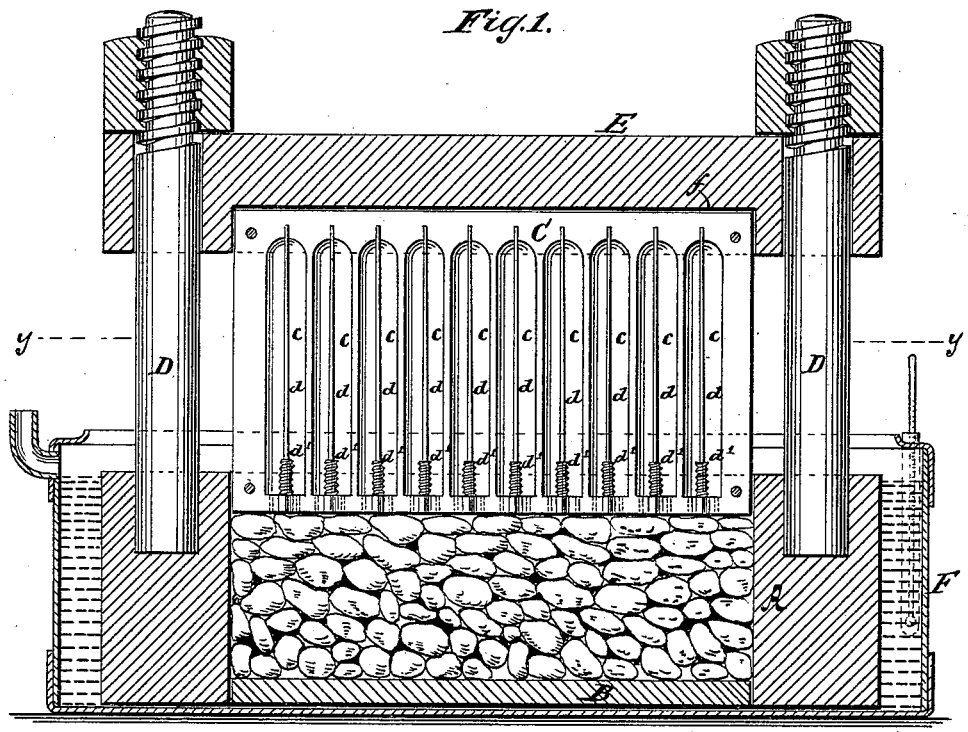
Figure 2:
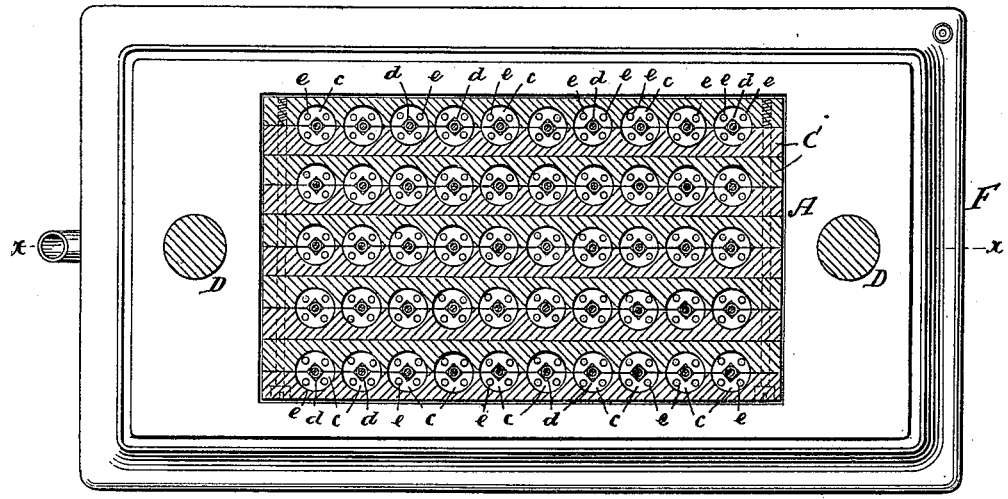
Figure 3:
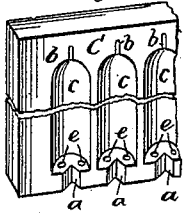

Figure 1 represents a longitudinal vertical section in the plane $x$ $x$, Fig. 2. Fig. 2 is a horizontal section in the plane $y$ $y$, Fig. 1. Fig. 3 is a perspective view of a portion of the mold.

In the drawings, the letter A designates a chamber, in which the resinous substance is heated to its melting-point, and which is open at the top and provided with a bottom plate B, fitting snugly into said heating-chamber, so that by forcing this plate upward through the chamber all the particles adhering to the inner walls of said chamber are removed, and consequently the operation of cleaning the heating-chamber can be performed with comparatively little loss of time. In the molding operation the bottom plate B of the heating-chamber A rests on and is sustained by the bottom wall of a kettle or boiler F, hereinafter described.

C is the mold, which is provided with a cavity or cavities $c$, corresponding to the article to be cast. Of course the mold must be made in two parts, which can be separated for the purpose of removing the castings. In the example illustrated in the drawings I have shown a mold for casting the tips or mouth-pieces for tobacco-pipes or cigar-holders, and each of the cavities $c$ is provided with a metallic core $d$, the bottom of which is square, fitting a corresponding recess $a$ on each half of the mold, Fig. 2, while the upper end of the core extends in a recess $b$, so that when the halves of the mold are clamped together the core is firmly retained in the required position, and when the casting is finished and the halves of the mold are taken apart the core $d$ can be readily withdrawn from the casting. It will also be noticed that the core $d$ is provided with an external screw-thread $d'$, so that each tip is provided with an internal screw-thread for securing the same to the pipe-stem or to the cigar-holder.

By referring to Fig. 2 of the drawings it will be seen that the mold C represented in the drawings contains fifty cavities $c$, so that fifty tips for pipes or cigar-holders can be cast at one operation. In the bottom of each of the cavities $c$ is a channel $e$, (one or more,) through which the molten substance flows into the corresponding cavity, as will be presently explained. If the mold is provided with a core $d$, the channels $e$ are arranged around said core, as indicated in Figs. 2 and 3.

The mold C fits the heating-chamber A snugly, and from the sides of the chamber rise two studs D D, which form guides for a cap E. In the under surface of this cap is formed a recess or cavity $f$, which fits the mold snugly, so that when said cap is placed upon the guide-studs D D and upon the mold C it serves to retain the mold in line with the cavity of the heating-chamber, and when pressure is applied to the cap E between the screw-nuts shown in any suitable manner the mold is forced down into the heating-chamber without being liable to bind.

The operation of my apparatus is as follows: The heating-chamber A, together with its bottom plate B, is placed into a kettle or boiler F, and then a quantity of the resinous substance is introduced into this chamber to fill the same up to within one inch (more or less) of its top edge. The resinous substance before being introduced into the heating-chamber is broken up into pieces or comminuted to any desired degree of fineness. Upon the resinous substance is placed the mold C, to which is applied the cap E, as shown in Fig. 1, and then the kettle F is filled with oil or any other suitable liquid and heated to the melting temperature of the substance in the heating-chamber. When this temperature has been reached, pressure is applied to the cap E by any suitable lever mechanism or other means, so that the mold C is forced down into the heating-chamber A. As the mold descends the molten substance passes through the channels e into the cavities c of the mold, and after the mold has been depressed to the depth required for filling up the cavities the heating-chamber is withdrawn from the kettle F and permitted to cool, then the finished castings are removed from the mold. As already stated, the inner walls of the heating-chamber can be readily cleaned by means of the movable bottom plate B.

What I claim as new, and desire to secure by Letters Patent, is—

1. The combination of a heating-chamber A for containing the substance to be molded, a pair of studs D, rising from the upper side of the heating-chamber, a sectional mold C, constructed to slide into and out of the heating-chamber and having channels e in its lower portion for the passage of the plastic material from the heating-chamber into the mold-cavities, and a pressure-cap E, bearing against the top of the mold and slidable downward upon the pair of studs to gradually force the mold upon the plastic material contained in the heating-chamber and thereby cause such material to pass into the mold-cavities, substantially as described.

2. The combination of a kettle or boiler F, a heating-chamber A, provided with a bottom plate B, movable through the heating-chamber and adapted to rest against the bottom wall of the kettle or boiler during the molding operation, a sectional mold constructed to slide into the heating-chamber and having channels e for the passage of a plastic material from the heating-chamber into the mold-cavities, and a pressure-cap bearing against the top of the mold for gradually forcing the latter into the heating-chamber and causing the plastic material contained therein to pass through the channels into the mold-cavities, substantially as described.

3. The combination, with the heating-chamber, of a mold fitting the heating-chamber, a core secured in the bottom of the mold, and a channel forming a communication between the heating-chamber and the interior of the mold, substantially as described.

In testimony whereof I have hereunto set my hand in the presence of two subscribing witnesses.

HERMANN THÜRFELDER.

Witnesses:
WM. C. HAUFF,
E. F. KASTENHUBER.